(12) United States Patent
Cravener (10) Patent No.: US 11,396,373 B2
(45) Date of Patent: Jul. 26, 2022

(54) PITCH CRANK ASSEMBLY WITH SPHERICAL BEARINGS

(71) Applicant: Bell Textron Inc., Fort Worth, TX (US)

(72) Inventor: Kyle Thomas Cravener, Arlington, TX (US)

(73) Assignee: Textron Innovations Inc., Providence, RI (US)

(*) Notice: Subject to any disclaimer, the term of this patent is extended or adjusted under 35 U.S.C. 154(b) by 160 days.

(21) Appl. No.: 16/874,084

(22) Filed: May 14, 2020

(65) Prior Publication Data

US 2021/0354815 A1  Nov. 18, 2021

(51) Int. Cl.
*B64C 29/00* (2006.01)
*B64C 27/605* (2006.01)
*B64C 11/28* (2006.01)

(52) U.S. Cl.
CPC .......... *B64C 29/0033* (2013.01); *B64C 11/28* (2013.01); *B64C 27/605* (2013.01)

(58) Field of Classification Search
CPC ......... B64C 11/28; B64C 27/22; B64C 27/28; B64C 27/30; B64C 27/605; B64C 29/0033
See application file for complete search history.

(56) References Cited

U.S. PATENT DOCUMENTS

| 2017/0144746 A1* | 5/2017 | Schank | B64C 29/0033 |
| 2019/0016441 A1* | 1/2019 | Schank | B64C 11/28 |
| 2020/0001992 A1* | 1/2020 | Wittke | B64C 27/82 |

* cited by examiner

*Primary Examiner* — Richard A Edgar
(74) *Attorney, Agent, or Firm* — Fogarty LLP (57) ABSTRACT

A pitch horn assembly for an aircraft comprises a pitch horn rotatably coupled to a connector pin along a first axis using a first set of spherical bearings. The connector pin is rotatably coupled to a housing along a second axis using a second set of spherical bearings. A crank is fixedly coupled to the connector pin, wherein the pitch horn and the crank are configured to commonly rotate relative to the housing.

20 Claims, 7 Drawing Sheets

PITCH CRANK ASSEMBLY WITH SPHERICAL BEARINGS

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering, and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven aircraft. During airplane mode of the tiltrotor, forward speed and range is limited by certain fundamental limitations of the rotor systems.

SUMMARY

Embodiments are directed to a pitch horn assembly for an aircraft comprising a pitch horn rotatably coupled to a connector pin along a first axis using a first set of spherical bearings. The connector pin is rotatably coupled to a housing along a second axis using a second set of spherical bearings. A crank is fixedly coupled to the connector pin, wherein the pitch horn and the crank are configured to commonly rotate relative to the housing. The housing is adapted to be mounted on a blade cuff of a rotor blade assembly. The second axis is a crank axis passing through the blade cuff. The pitch horn is adapted to be pivotably coupled to a pitch link, and wherein the pitch horn and the crank are configured to commonly rotate in response to translation of the pitch link. The first axis and the second axis are approximately perpendicular to each other. The first set of spherical bearings and the second set of spherical bearings may each comprise two spherical bearings. The first set of spherical bearings are positioned around the connector pin and within the pitch horn. The second set of spherical bearings are positioned around the connector pin and within the housing.

In another embodiment, a mechanism for transitioning a rotor blade between an extended position and a folded position is disclosed. The rotor blade is rotatably coupled to a blade cuff about a blade-fold axis. The mechanism comprises a swash plate configured to translate relative to a mast; a pitch link rotatably coupled to the swash plate; a pitch horn assembly comprising a pitch horn rotatably coupled to a connector pin along a first axis using a first set of one or more spherical bearings, wherein the pitch horn is rotatably coupled to the pitch link, the connector pin rotatably coupled to a housing along a second axis using a second set of one or more spherical bearings, and a crank fixedly coupled to the connector pin, wherein the pitch horn and the crank are configured to commonly rotate relative to the housing in response to translation of the swash plate; and a blade-fold link rotatably coupled to the crank and rotatably coupled to the rotor blade. The mechanism is configured to cause the rotor blade to rotate greater than 90 degrees while the pitch horn rotates less than 90 degrees. The mechanism further comprises a blade lock having a locked position and an unlocked position, the blade lock being configured to lock the pitch horn in a fixed position relative to the blade cuff in the locked position, wherein translation of the swash plate is configured to cause rotation of the rotor blade about a pitch-change axis when the blade lock is in the locked position.

In a further embodiment, a tiltrotor aircraft comprises a mast, a rotor assembly comprising a rotor hub having an arm and a rotor blade assembly being rotatably coupled to the arm about a pitch-change axis. The rotor blade assembly includes a blade cuff and a rotor blade. The rotor blade is rotatably coupled to the blade cuff about a blade-fold axis. A blade folding mechanism comprises a swash plate configured to translate relative to the mast, and a pitch link is rotatably coupled to the swash plate. A pitch horn assembly comprises a pitch horn rotatably coupled to a connector pin along a first axis using a first set of spherical bearings, wherein the pitch horn is rotatably coupled to the pitch link. The connector pin is rotatably coupled to a housing along a second axis using a second set of spherical bearings. A crank is fixedly coupled to the connector pin, wherein the pitch horn and the crank are configured to commonly rotate relative to the housing in response to translation of the swash plate. A blade-fold link is rotatably coupled to the crank and rotatably coupled to the rotor blade.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
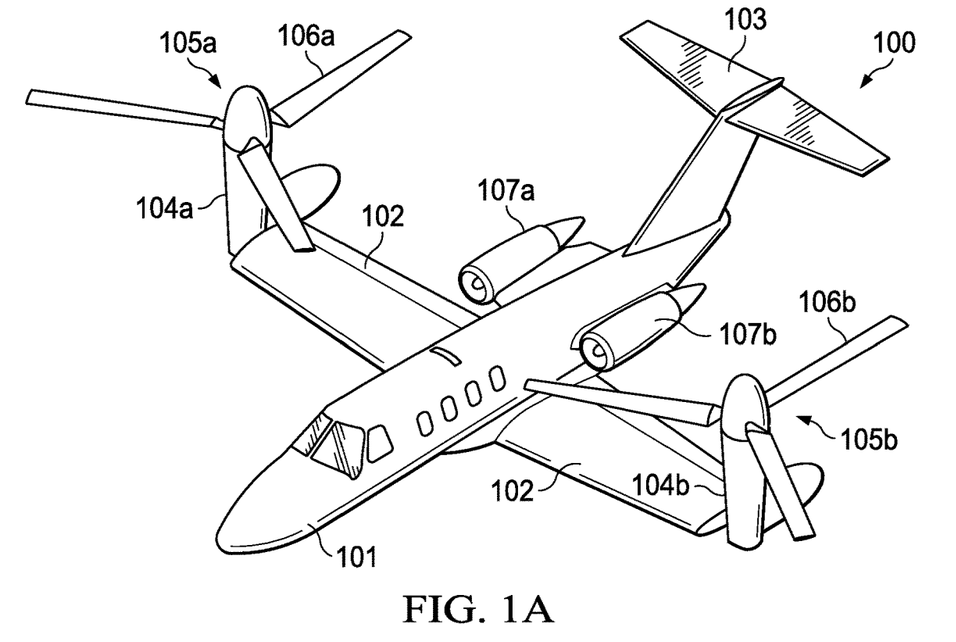
FIGS. 1A-1C illustrates a tiltrotor aircraft in various rotary and non-rotary flight modes.
Figure 1B:
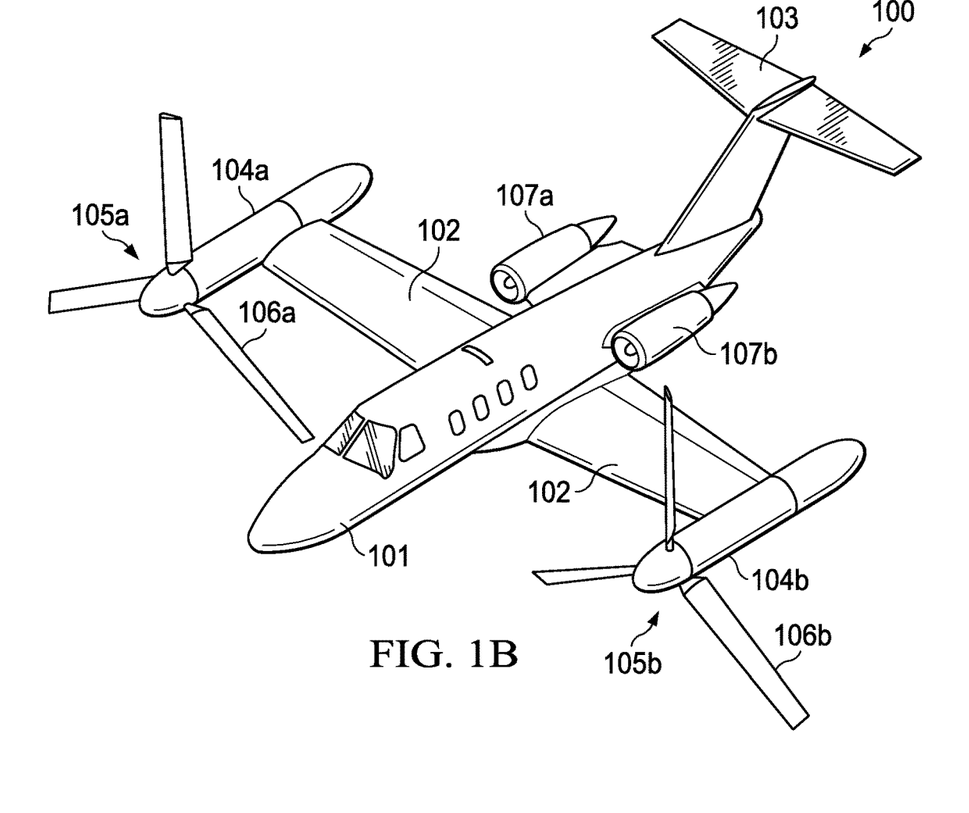
Figure 1C:
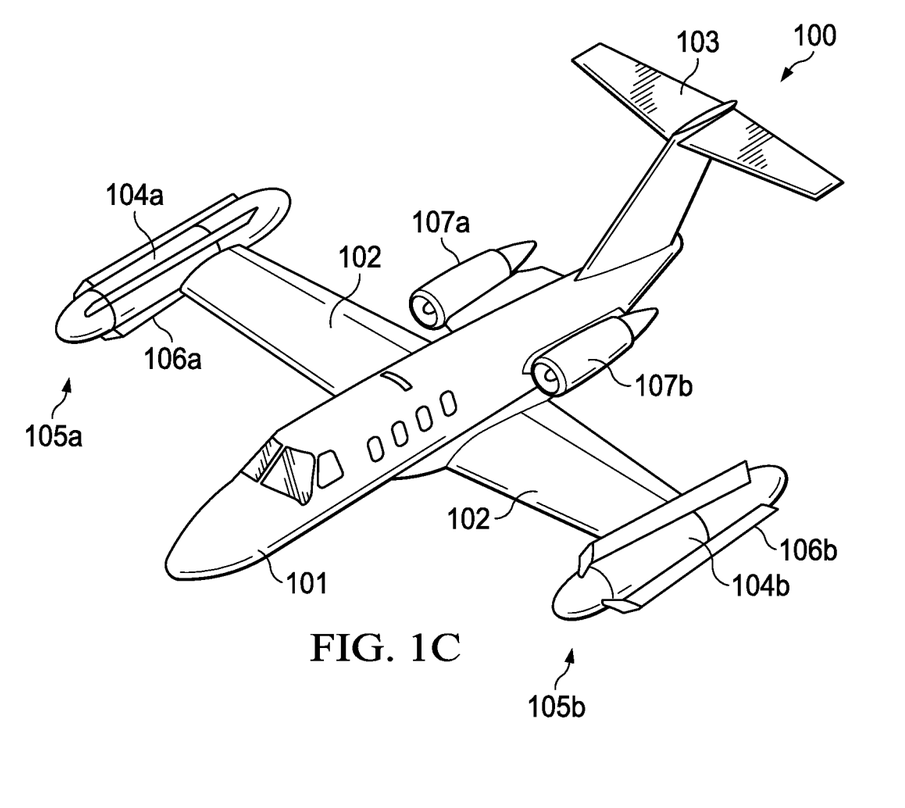

Referring to FIGS. 1A-1C, a tiltrotor aircraft is schematically illustrated and generally designated 100. Tiltrotor aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that tiltrotor aircraft 100 flies much like a conventional propeller driven aircraft.

In the rotary flight modes, proprotor assemblies 105a, 105b rotate in opposite directions to provide torque balancing to tiltrotor aircraft 100. For example, when viewed from the front of tiltrotor aircraft 100 in proprotor forward flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 1-7b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates tiltrotor aircraft 100 in airplane forward flight mode, in which proprotor blades 106a, 106b have been folded so that they are oriented substantially parallel to respective pylon assemblies 104a, 104b. This configuration minimizes the drag force generated by proprotor blades 106b, 106c during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed. Apparatus for folding rotor blades on a stop-fold aircraft are disclosed, for example, in U.S. Pat. No. 8,998,125 B2, U.S. Pat. No. 10,336,447 B2, and U.S. Pat. No. 10,526,068 B2, the disclosures of which are hereby incorporated herein by reference in their entirety.

Tiltrotor aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the lift engine may again engage proprotor assemblies 105a, 105b. When torque power is applied to rotate proprotor blades 106a, 106b, tiltrotor aircraft 100 enters proprotor forward-flight mode. Tiltrotor aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

A flight control computer may be incorporated into tiltrotor aircraft 100 and may be configured to control and communicate with various systems including, for example, proprotor blade control systems in proprotor assembly 105a, 105b. The proprotor blade control systems may be communicably coupled to the flight control computer and may provide closed-loop control of controllable elements located within the proprotor assemblies 105a, 105b. The controllable elements within the proprotor assemblies 105a, 105b may include any structural feature operable to move and/or effect change such as, for example, blade locks, a gimbal lock, trailing-edge flaps, twistable blades, independently controllable elements attached or connected to blades, combinations of the foregoing and/or the like.

The proprotor blade control systems may include, for example, actuators that control motion of the controllable elements in the proprotor assemblies 105a, 105b, sensors that provide feedback data related to the controllable elements, and control computers that operate the actuators, for example, by transmitting control signals to the actuators. The flight control computer and the proprotor blade control systems may collaboratively provide a variety of redundant control methods relative to the controllable elements in the proprotor assemblies 105a, 105b.

Although tiltrotor aircraft 100 has been described as having an internal lift engine and separate external thrust engines 107a, 107b, wherein the lift engine may operate both of the proprotor assemblies in rotary flight mode, it should be understood by those having ordinary skill in the art that other engine arrangements are possible and are considered to be within the scope of the present disclosure. For example, in an alternative embodiment, tiltrotor aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations. In other embodiments, the thrust engines 107a, 107b may be located inside fuselage 101 or on wings 102. In further embodiments, the same engine(s) may provide both lifting and thrust power, such as an engine with turboshaft, turbofan, and/or turboprop capabilities.

Figure 2A:
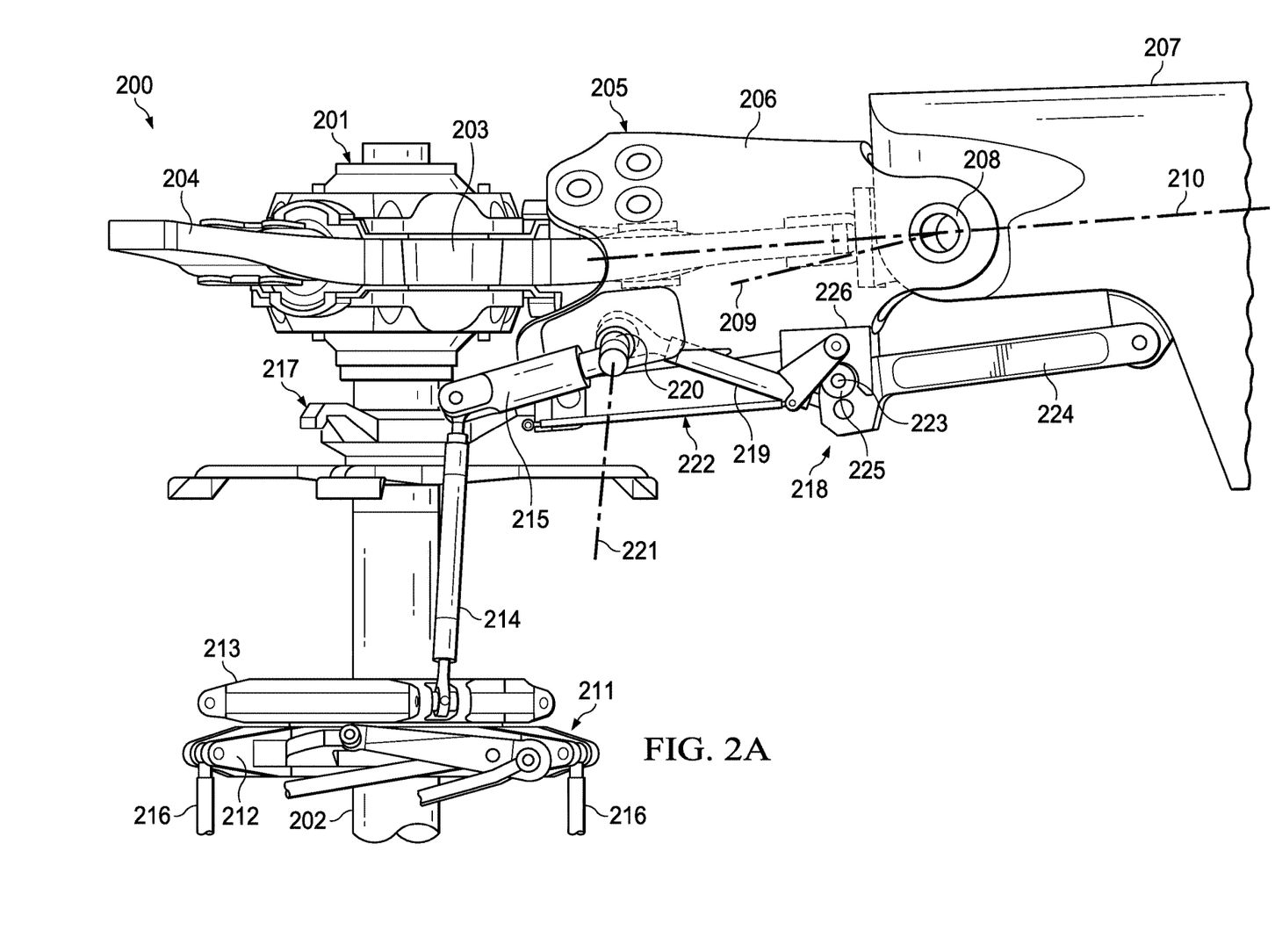
FIGS. 2A-2C illustrate a mechanism for transitioning a tiltrotor aircraft between rotary and non-rotary flight modes.
Figure 2B:
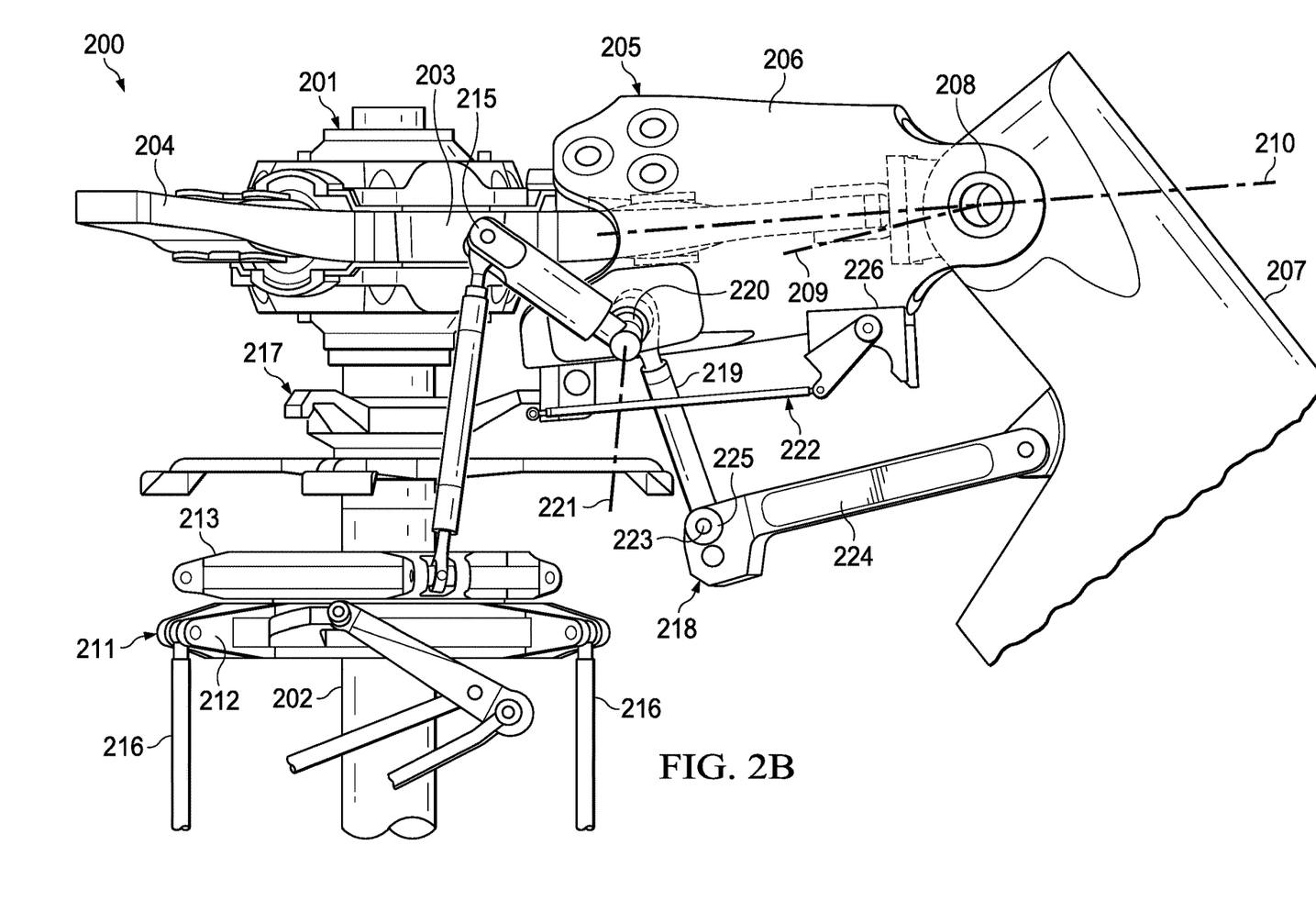
Figure 2C:
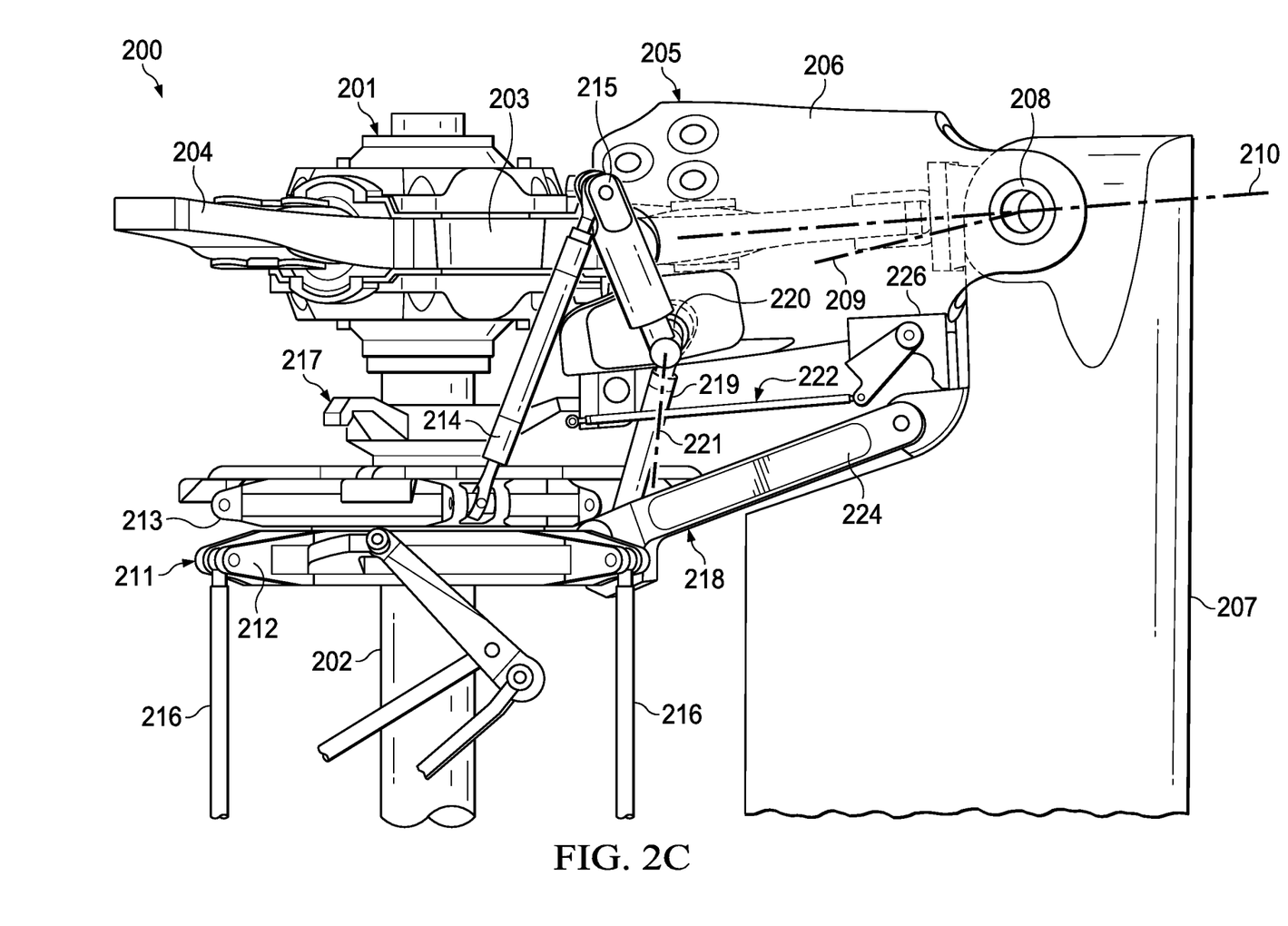

FIGS. 2A-2C illustrate a mechanism 200 for transitioning a tiltrotor aircraft between rotary and non-rotary flight modes. In the illustrated embodiment, a gimbal-mounted, three-bladed rotor assembly 201 having a gimballing degree of freedom relative to a mast 202. Rotor assembly 201 includes a rotor hub 203 that is coupled to and operable to rotate with mast 202. Rotor hub 203 has three arms 204, each of arms 204 supporting a rotor blade assembly 205, only one rotor blade assembly 205 being visible in the figures. Each rotor blade assembly 205 includes a cuff 206 and a rotor blade 207 that is pivotably coupled to cuff 206 by a connection member depicted as pin 208, whereby rotor blade 207 pivots relative to cuff 206 about a blade-fold axis 209. As discussed herein, rotor blade assembly 205 has a pitching degree of freedom during rotary flight and a folding degree of freedom during non-rotary flight. The pitching degree of freedom is about a pitch-change axis 210, which is generally perpendicular to blade-fold axis 209.

The pitching and folding degrees of freedom of rotor blade assembly 205 are realized by the operation of swash plate 211. Swash plate 211 includes a non-rotating lower swash plate element 212 and a rotating upper swash plate element 213. Rotating upper swash plate element 213 is operably coupled to each rotor blade assembly 205 at cuff 206 via a pitch link 214 and a pitch horn 215, only one such connection being visible in the figures. A control system, including swash plate actuators 216, is coupled to non-rotating lower swash plate element 212. The control system operates responsive to pilot input to raise, lower and tilt non-rotating lower swash plate element 212 and thus rotating upper swash plate element 213 relative to mast 202. These movements of swash plate 211 collectively and cyclically control the pitch of rotor blade assemblies 205 during rotary flight and fold rotor blades 207 during non-rotary flight.

Transitioning mechanism 200 also includes a blade stop assembly 217 that is coupled to, and operable to rotate with, mast 202. Blade stop assembly 217 includes three arms that correspond to the three rotor blade assemblies 205 of rotor assembly 201. The arms of blade stop assembly 217 will each engage blade assembly 205 upon feathering rotor blade assemblies 205, responsive to lowering swash plate 211. In this manner, blade stop assembly 217 provides a positive stop for rotor blade assemblies 205.

Transitioning mechanism 200 also includes three blade lock assemblies 218, only one being visible in the figures. Each blade lock assembly 218 is selectively operable to enable and disable the folding degree of freedom and the pitching degree of freedom of the respective rotor blade assembly 205. As illustrated, each blade lock assembly 218 includes a fold-link crank 219 that is rotatably coupled to cuff 206 and rotatable with pitch horn 215 via a connection member depicted as pin 220. In this manner, rotation of crank 219 is responsive to the rise and fall of swash plate 211 in non-rotary flight. Crank 219 and pitch horn 215 rotate relative to relative to cuff 206 about a crank axis 221.

In one embodiment, crank axis 221 is skew relative to blade-fold axis 209, and pin 220 extends through cuff 206. Crank axis 221 may be angled about 18 degrees relative to blade-fold axis 209. Accordingly, fold-link crank 219 is coupled to pin 220 within a volume of cuff 206. Pin 220 preferably comprises a spherical roller bearing to facilitate rotation about crank axis 221 while resisting axial forces along crank axis 221. As best shown, in FIG. 2C, a portion of pitch horn 215 extends above rotor hub 203 when rotor blade 207 is in the folded position. Canted crank axis 221 enables this to occur without effecting the structural integrity of rotor hub 203. In addition, it preserves the preferred configuration that causes greater than 90 degrees of rotation of rotor blade 207 in response to less than 90 degrees of rotation of pitch horn 215.

Each blade lock assembly 218 further includes a blade lock 222 having a fold lock position securing pivot joint 223 of blade lock assembly 218 to cuff 206 and a pitch lock position securing cuff 206 to blade stop assembly 217.

The operation of transitioning mechanism 200 will now be described with reference to an exemplary flight of tiltrotor aircraft 100. For vertical takeoff and hovering in helicopter flight mode, as best seen in FIG. 1A, and low speed forward flight in proprotor forward flight mode, as best seen in FIG. 1B, tiltrotor aircraft 100 is in rotary flight mode. These flight modes correspond to FIG. 2A wherein each of blade lock assemblies 218 is set to enable a pitching degree of freedom and disabling the folding degree of freedom of rotor blade assemblies 205. In this configuration, swash plate 211 collectively and cyclically controls the pitch of rotor blade assemblies 205 responsive to pilot input.

When it is desired to transition tiltrotor aircraft 100 from low speed forward flight in proprotor forward flight mode, as best seen in FIG. 1B, to high speed forward flight in jet flight mode, as best seen in FIG. 1C, transitioning mechanism 200 is used to safely achieve this result. Swash plate 211 is used to collectively shift the pitch of rotor blade assemblies 205 to the feathering position, wherein rotor blades 207 act as brakes to aerodynamically stop the rotation of rotor assemblies 201. To disable the gimballing degree of freedom of rotor assembly 201, a gimbal lock (not shown) is actuated. At the same time, responsive to the actuation of the gimbal lock, the arms of blade stop assembly 217 are raised to provide a positive stop for rotor blade assemblies 205.

Next, blade locks 222 shift from the fold lock position to the pitch lock position, which disables the pitching degree of freedom and enables the folding degree of freedom of rotor blade assemblies 205. Swash plate 211 is now used to collectively shift rotor blade assemblies 205 from the radially outwardly extending feathering position, as best seen in FIGS. 1B and 2A, to a folded orientation, as best seen in FIGS. 1C and 2C. With the pitching degree of freedom disabled, the rise or fall of swash plate 211 commonly rotates pitch horn 215 and fold-link crank 219 (via pitch link 214) relative to cuff 206 about crank axis 221. The rotation of crank 219 causes blade-fold link 224 to rotate at pivot joint 223, which disengages flange 225 from seats 226, and rotation of rotor blade 207 relative to cuff 206 about pin 208 and blade-fold axis 209, as best seen in FIG. 2B. Continued operation of swash plate 211 causes continued rotation of pitch horn 215, fold-link crank 219, blade-fold link 224, and rotor blade 207 until rotor blade 207 reaches its desired folded orientation, as best seen in FIGS. 1C and 2C. Tiltrotor aircraft 100 is now in jet flight mode, which is the high-speed forward flight mode of tiltrotor aircraft 100 and is a non-rotary flight mode. In this operational mode, engines 107a, 107b are in turbofan mode and provide no torque or rotational energy to proprotor assemblies 105a, 105b.

When it is desired to transition back to proprotor forward flight mode, as best seen in FIG. 1B, from jet flight mode, as best seen in FIG. 1C, transitioning mechanism 200 is used to achieve this result. With the pitching degree of freedom disabled, lowering swash plate 211 (and pitch links 214) commonly rotates pitch horn 215 and crank 219 relative to cuff 206 about crank axis 221, which in turn causes rotation of blade-fold link 224 and the unfolding of rotor blade 207, as best seen in FIG. 2B. Continued operation of swash plate 211 causes continued rotation of pitch horn 215, crank 219, blade-fold link 224, and rotor blade 207 until rotor blade 207 reaches its desired radially outwardly extending orientation, as best seen in FIGS. 1B and 2C. In this position, crank 219 and blade-fold link 224 are extended such that flanges 225 have entered seats 226, as best seen in FIG. 2A.

Next, blade locks 222 shift from the pitch lock position to the fold lock position, which enables the pitching degree of freedom of rotor blade assemblies 205 about pitch-change axis 221 and disabling the folding degree of freedom of rotor blade assembly 205. Swash plate 211 may now be used to collectively shift rotor blade assemblies 205 from the feathering position to a windmilling orientation.

Figure 3:
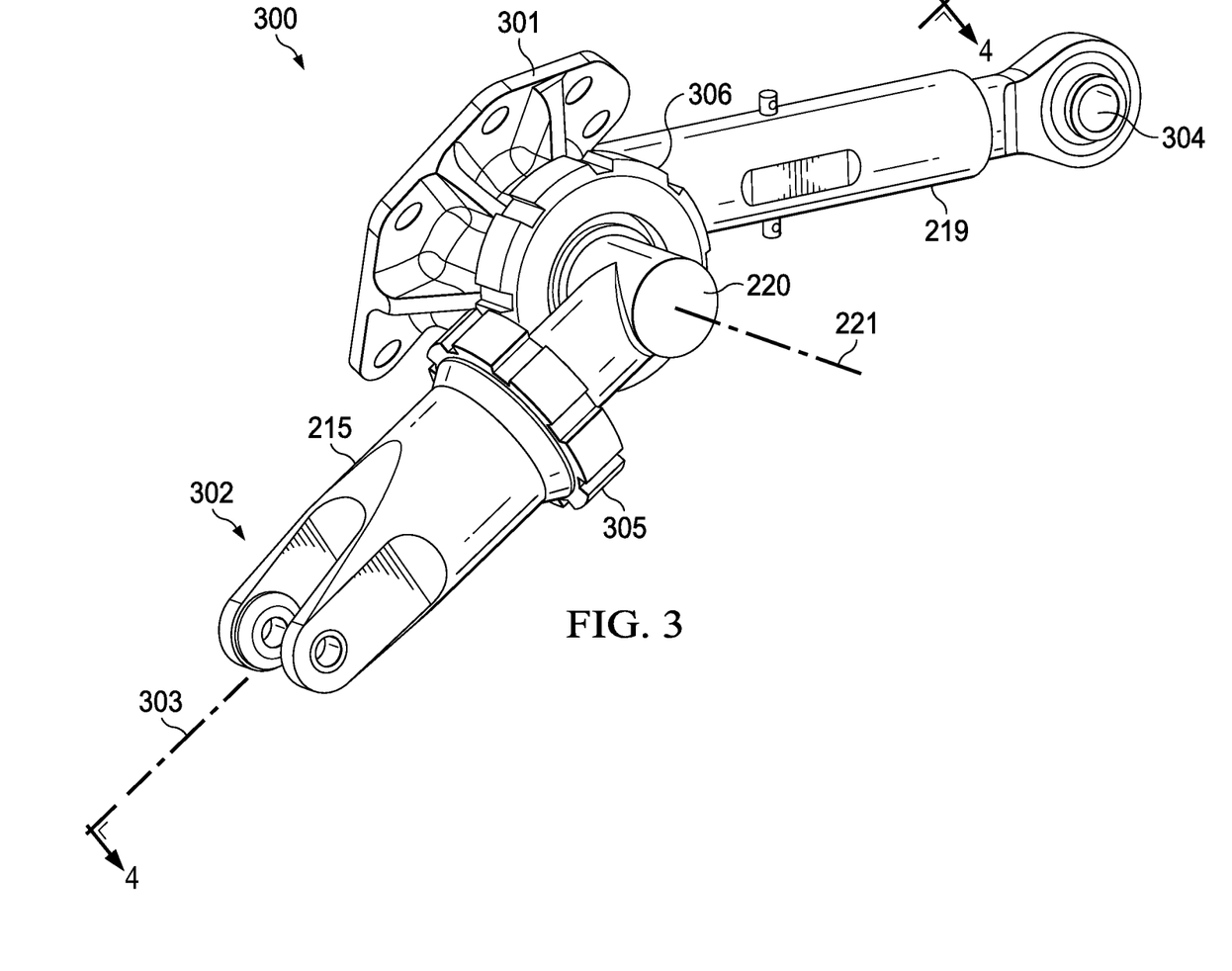
FIG. 3 illustrates a pitch crank assembly for use in a mechanism for transitioning a tiltrotor aircraft between rotary and non-rotary flight modes.

FIG. 3 illustrates a pitch crank assembly 300 for use in the mechanism 200 for transitioning a tiltrotor aircraft between rotary and non-rotary flight modes. Pitch crank assembly 300 comprises pitch horn 215 that is coupled to fold-link crank 219 by connector pin 220. Pitch crank assembly 300 may be rotatably attached to cuff 206 using housing 301. Connector pin 220 is attached to housing 301 using spherical bearings. During folding and unfolding of the rotor blades, pitch horn 215 and crank 219 rotate together about crank axis 221. Pitch horn 215 is attached to connector pin 220 using spherical bearings and has a clevis 302 that is adapted to connect to a pitch link 214. When pitch crank assembly 300 rotates around crank axis 221 during folding and unfolding of the rotor blades, pitch horn 215 may also rotate about axis 303, which allows pitch horn 215 to move freely without binding on pitch link 214 through the entire range of motion of pitch crank assembly 300. Fold-link 219 is pivotably coupled to blade-fold link 224 at connector 304. Rotation of fold-link crank 219 causes rotation of blade-fold link 224, which results in the folding or unfolding of the rotor blade.

Figure 4:
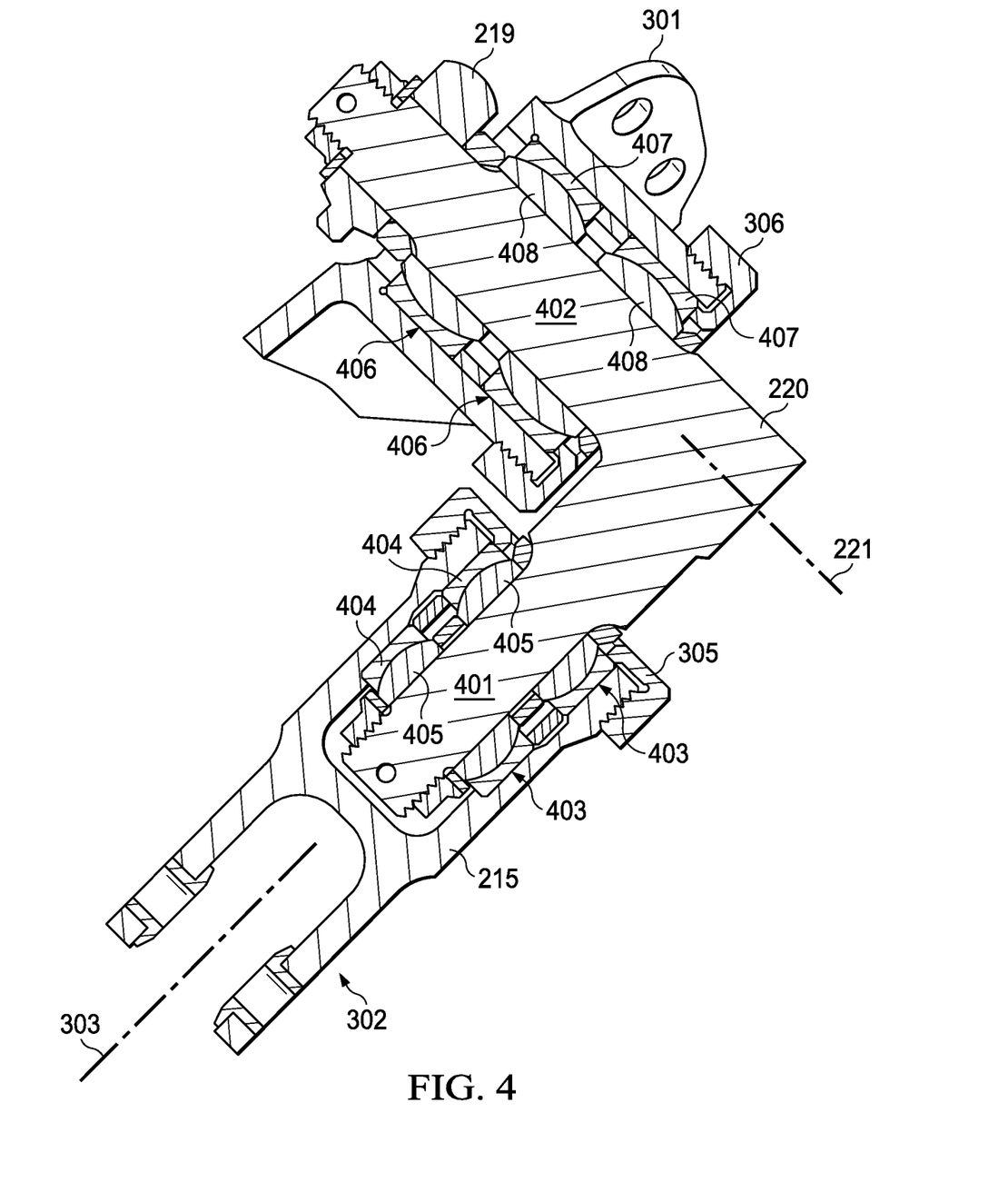
FIG. 4 is a cross-section view of the pitch crank assembly shown in FIG. 3.

FIG. 4 is a cross-section view of the pitch crank assembly 300 shown in FIG. 3. As shown in FIG. 4, connector pin 220 has two arms 401 and 402. One or more spherical bearings 403 couple arm 401 of connector pin 220 to pitch horn 215. Each spherical bearing 403 comprises an outer ring 404 and an inner ring 405, which is captive within outer ring 404 in the axial direction. A threaded cap 305 is attached to pitch horn 215 to hold spherical bearings 403 in place. Similarly, one or more spherical bearings 403 couple arm 402 of connector pin 220 to housing 301. Each spherical bearing 406 comprises an outer ring 407 and an inner ring 408, which is captive within outer ring 407 in the axial direction. A threaded cap 306 is attached to housing to hold spherical bearings 406 in place. The outer surface of inner rings 405, 408 and the inner surface of outer rings 404, 407 are spherical and are self-lubricated to slide across each other.

The use of spherical bearings 403 and 406 has advantages over existing systems because each spherical bearing is locked axially in two directions compared to prior designs that used opposed tapered roller bearings. Connector pin 220 will not slide within pitch horn 215 along axis 303, and connector pin 220 will not slide within housing 301 along axis 221. However, the spherical bearings 403 and 406 provide a rotational degree of freedom so that pitch horn 215 can rotate around axis 303 and connector pin 220 can rotate around axis 221. Spherical bearings 403 and 406 also have the advantage of taking much larger radial loads compared to tapered roller bearings or needle bearings, which allows for a smaller overall packaging and reduced weight for the pitch crank assembly. In this embodiment, wherein the device undergoes cyclic motion versus complete spinning motion, spherical bearings are expected to perform better than tapered roller bearings or needle bearings.

The foregoing has outlined rather broadly the features and technical advantages of the present invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the description when considered in connection with the accompanying figures. It is to be expressly understood, however, that each of the figures is provided for the purpose of illustration and description only and is not intended as a definition of the limits of the present invention.

What is claimed is:

1. A pitch horn assembly for an aircraft, comprising:
   a pitch horn rotatably coupled to a connector pin along a first axis using a first set of one or more spherical bearings;
   the connector pin rotatably coupled to a housing along a second axis using a second set of one or more spherical bearings; and
   a crank fixedly coupled to the connector pin, wherein the pitch horn and the crank are configured to commonly rotate relative to the housing.

2. The pitch horn assembly of claim 1, wherein the housing is adapted to be mounted on a blade cuff of a rotor blade assembly.

3. The pitch horn assembly of claim 2, wherein the second axis is a crank axis passing through the blade cuff.

4. The pitch horn assembly of claim 1, wherein the pitch horn is adapted to be pivotably coupled to a pitch link, and wherein the pitch horn and the crank are configured to commonly rotate in response to translation of the pitch link.

5. The pitch horn assembly of claim 1, wherein the first axis and the second axis are generally perpendicular.

6. The pitch horn assembly of claim 1, wherein the first set of spherical bearings and the second set of spherical bearings each comprise two spherical bearings.

7. The pitch horn assembly of claim 1, wherein the first set of one or more spherical bearings are positioned around the connector pin and within the pitch horn.

8. The pitch horn assembly of claim 1, wherein the second set of one or more spherical bearings are positioned around the connector pin and within the housing.

9. A mechanism for transitioning a rotor blade between an extended position and a folded position, wherein the rotor blade is rotatably coupled to a blade cuff about a blade-fold axis, the mechanism comprising:
   a swash plate configured to translate relative to a mast;
   a pitch link rotatably coupled to the swash plate;
   a pitch horn assembly comprising:
      a pitch horn rotatably coupled to a connector pin along a first axis using a first set of one or more spherical bearings, wherein the pitch horn is rotatably coupled to the pitch link;
      the connector pin rotatably coupled to a housing along a second axis using a second set of one or more spherical bearings; and
      a crank fixedly coupled to the connector pin, wherein the pitch horn and the crank are configured to commonly rotate relative to the housing in response to translation of the swash plate; and
   a blade-fold link rotatably coupled to the crank and rotatably coupled to the rotor blade.

10. The mechanism of claim 9, wherein the mechanism is configured to cause the rotor blade to rotate greater than 90 degrees while the pitch horn rotates less than 90 degrees.

11. The mechanism of claim 9, further comprising:
    a blade lock having a locked position and an unlocked position, the blade lock being configured to lock the pitch horn in a fixed position relative to the blade cuff in the locked position, wherein translation of the swash plate is configured to cause rotation of the rotor blade about a pitch-change axis when the blade lock is in the locked position.

12. The mechanism of claim 9, wherein the housing is adapted to be mounted on the blade cuff.

13. The mechanism of claim 9, wherein the second axis is a crank axis passing through the blade cuff.

14. The mechanism of claim 9, wherein the first axis and the second axis are generally perpendicular.

15. The mechanism of claim 9, wherein the first set of spherical bearings and the second set of spherical bearings each comprise two spherical bearings.

16. The mechanism of claim 9, wherein the first set of one or more spherical bearings are positioned around the connector pin and within the pitch horn.

17. The mechanism of claim 9, wherein the second set of one or more spherical bearings are positioned around the connector pin and within the housing.

18. A tiltrotor aircraft, comprising:
    a mast;
    a rotor assembly, comprising:
       a rotor hub having an arm; and
       a rotor blade assembly being rotatably coupled to the arm about a pitch-change axis, the rotor blade assembly including a blade cuff and a rotor blade, the rotor blade being rotatably coupled to the blade cuff about a blade-fold axis; and
    a blade folding mechanism, comprising:
       a swash plate configured to translate relative to the mast;
       a pitch link rotatably coupled to the swash plate;
       a pitch horn assembly comprising:
          a pitch horn rotatably coupled to a connector pin along a first axis using a first set of one or more spherical bearings, wherein the pitch horn is rotatably coupled to the pitch link;
          the connector pin rotatably coupled to a housing along a second axis using a second set of one or more spherical bearings; and
          a crank fixedly coupled to the connector pin, wherein the pitch horn and the crank are configured to commonly rotate relative to the housing in response to translation of the swash plate; and
       a blade-fold link rotatably coupled to the crank and rotatably coupled to the rotor blade.

19. The tiltrotor aircraft of claim 18, wherein the first set of one or more spherical bearings are positioned around the connector pin and within the pitch horn.

20. The tiltrotor aircraft of claim 18, wherein the second set of one or more spherical bearings are positioned around the connector pin and within the housing.

* * * * *